United States Patent
Takeda et al.

(10) Patent No.: US 9,416,258 B2
(45) Date of Patent: Aug. 16, 2016

(54) RUBBER COMPOSITION FOR TIRE, AND PNEUMATIC TIRE

(71) Applicant: The Yokohama Rubber Co., LTD., Minato-ku, Tokyo (JP)

(72) Inventors: Shinya Takeda, Hiratsuka (JP); Makoto Ashiura, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/394,720

(22) PCT Filed: Apr. 16, 2013

(86) PCT No.: PCT/JP2013/061295
§ 371 (c)(1),
(2) Date: Oct. 15, 2014

(87) PCT Pub. No.: WO2013/157545
PCT Pub. Date: Oct. 24, 2013

(65) Prior Publication Data
US 2015/0099844 A1 Apr. 9, 2015

(30) Foreign Application Priority Data

Apr. 16, 2012 (JP) ................................. 2012-093077

(51) Int. Cl.
C08L 9/06 (2006.01)
C08L 7/00 (2006.01)
C08K 3/36 (2006.01)
(Continued)

(52) U.S. Cl.
CPC ................ *C08L 9/00* (2013.01); *B60C 1/0016* (2013.04); *C08L 7/00* (2013.01); *C08L 9/06* (2013.01); *C08K 2201/006* (2013.01)

(58) Field of Classification Search
USPC ........................................................ 524/493
See application file for complete search history.

(56) References Cited

U.S. PATENT DOCUMENTS

| | | | |
|---|---|---|---|
| 6,506,829 B1 * | 1/2003 | Materne | B60C 1/0016 524/262 |
| 2011/0144236 A1 * | 6/2011 | Mihara | 523/158 |
| 2015/0031791 A1 | 1/2015 | Sugiura | |

FOREIGN PATENT DOCUMENTS

| | | |
|---|---|---|
| DE | 11 2013 000 983 | 12/2014 |
| JP | 2008-101127 | 5/2008 |
| JP | 2009-084413 | 4/2009 |

(Continued)

OTHER PUBLICATIONS

International Search Report for International Application Serial No. PCT/JP2013/061295 dated Jun. 18, 2013, 4 pages, Japan.

*Primary Examiner* — Ling Choi
*Assistant Examiner* — Thuy-Ai Nguyen
(74) *Attorney, Agent, or Firm* — Thorpe North & Western

(57) ABSTRACT

A rubber composition for tires comprises: per 100 parts by weight of diene rubber containing from 5 to 50 wt. % of modified BR having a vinyl unit content of 10 to 60 wt. %, from 2 to 50 parts by weight of an aromatic modified terpene resin having a softening point of 100 to 130° C., and a total content of 60 to 130 parts by weight of two types of silica, that is silica X and silica Y; a proportion of the silica relative to a total amount of a reinforcing filler containing carbon black being 85 wt. % or greater; a nitrogen adsorption specific surface area of the silica X is 140 m$^2$/g or greater; and a nitrogen adsorption specific surface area of the silica Y is greater than 100 m$^2$/g and less than 140 m$^2$/g.

5 Claims, 5 Drawing Sheets

| | | Comparative Example 1 | Working Example 1 | Working Example 2 | Working Example 3 | Working Example 4 | Working Example 5 | Comparative Example 2 | Comparative Example 3 | Comparative Example 4 | Comparative Example 5 |
|---|---|---|---|---|---|---|---|---|---|---|---|
| Modified BR 1 | pbw | | 17 | 10 | 30 | 50 | 17 | | | | 30 |
| Modified BR 2 | pbw | | | | | | | 30 | | | |
| Unmodified BR 1 | pbw | 17 | | | | | | | 30 | | |
| Unmodified BR 2 | pbw | | | | | | | | | 30 | |
| Modified S-SBR | pbw | 90.8 (66) | 90.8 (66) | 100.4 (73) | 72.9 (53) | 45.4 (33) | 90.8 (66) | 72.9 (53) | 72.9 (53) | 72.9 (53) | 72.9 (53) |
| NR | pbw | 17 | 17 | 17 | 17 | 17 | 17 | 17 | 17 | 17 | 17 |
| Silica X1 | pbw | 80.0 | 69.0 | 69.0 | 60.0 | 60.0 | 40.0 | 60.0 | 60.0 | 60.0 | 60.0 |
| Silica Y1 | pbw | | 11.0 | 11.0 | 10.0 | 10.0 | 40.0 | 10.0 | 10.0 | 10.0 | 10.0 |
| Carbon black | pbw | 10.0 | 10.0 | 10.0 | 10.0 | 10.0 | 10.0 | 10.0 | 10.0 | 10.0 | 10.0 |
| Coupling agent | pbw | 6.4 | 6.4 | 6.4 | 5.6 | 5.6 | 6.4 | 5.6 | 5.6 | 5.6 | 5.6 |
| Modified terpene resin 1 | pbw | 0.0 | 10.0 | 7.5 | 7.5 | 7.5 | 10.0 | 7.5 | 7.5 | 7.5 | 0.0 |
| Aroma oil | pbw | 20.0 | 10.0 | 5.0 | 5.0 | 12.5 | 10.0 | 5.0 | 5.0 | 5.0 | 12.5 |
| Silica proportion | wt.% | 88.9 | 88.9 | 88.9 | 87.5 | 87.5 | 88.9 | 87.5 | 87.5 | 87.5 | 87.5 |
| Wet performance | Index value | 100 | 110 | 105 | 105 | 103 | 105 | 97 | 95 | 95 | 90 |
| Rolling resistance | Index value | 100 | 118 | 118 | 133 | 167 | 133 | 115 | 118 | 115 | 140 |
| Wear resistance | Index value | 100 | 110 | 105 | 113 | 115 | 105 | 105 | 102 | 106 | 105 |

(51) Int. Cl.
*C08L 9/00* (2006.01)
*B60C 1/00* (2006.01)

(56) References Cited

FOREIGN PATENT DOCUMENTS

| | | |
|---|---|---|
| JP | 2009-138157 | 6/2009 |
| JP | 2010-168528 | 8/2010 |
| JP | 2011-094012 | 5/2011 |
| JP | 2011-122057 | 6/2011 |
| JP | 2011-132307 | 7/2011 |
| JP | 2012-007145 | 1/2012 |
| JP | 2013-036025 | 2/2013 |
| WO | WO 2013/057993 | 4/2013 |
| WO | WO 2013/122237 | 8/2013 |

\* cited by examiner

| | | Comparative Example 1 | Working Example 1 | Working Example 2 | Working Example 3 | Working Example 4 | Working Example 5 | Comparative Example 2 | Comparative Example 3 | Comparative Example 4 | Comparative Example 5 |
|---|---|---|---|---|---|---|---|---|---|---|---|
| Modified BR 1 | pbw | | | 10 | 30 | 50 | | | | | |
| Modified BR 2 | pbw | | 17 | | | | 17 | | | | 30 |
| Unmodified BR 1 | pbw | 17 | | | | | | | 30 | | |
| Unmodified BR 2 | pbw | | | | | | | 30 | | 30 | |
| Modified S-SBR | pbw | 90.8 (66) | 90.8 (66) | 100.4 (73) | 72.9 (53) | 45.4 (33) | 90.8 (66) | 72.9 (53) | 72.9 (53) | 72.9 (53) | 72.9 (53) |
| NR | pbw | 17 | 17 | 17 | 17 | 17 | 17 | 17 | 17 | 17 | 17 |
| Silica X1 | pbw | 80.0 | 69.0 | 69.0 | 60.0 | 60.0 | 40.0 | 60.0 | 60.0 | 60.0 | 60.0 |
| Silica Y1 | pbw | | 11.0 | 11.0 | 10.0 | 10.0 | 40.0 | 10.0 | 10.0 | 10.0 | 10.0 |
| Carbon black | pbw | 10.0 | 10.0 | 10.0 | 10.0 | 10.0 | 10.0 | 10.0 | 10.0 | 10.0 | 10.0 |
| Coupling agent | pbw | 6.4 | 6.4 | 6.4 | 5.6 | 5.6 | 6.4 | 5.6 | 5.6 | 5.6 | 5.6 |
| Modified terpene resin 1 | pbw | 0.0 | 10.0 | 7.5 | 7.5 | 7.5 | 10.0 | 7.5 | 7.5 | 7.5 | 0.0 |
| Aroma oil | pbw | 20.0 | 10.0 | 5.0 | 5.0 | 12.5 | 10.0 | 5.0 | 5.0 | 5.0 | 12.5 |
| Silica proportion | wt.% | 88.9 | 88.9 | 88.9 | 87.5 | 87.5 | 88.9 | 87.5 | 87.5 | 87.5 | 87.5 |
| Wet performance | Index value | 100 | 110 | 105 | 105 | 103 | 105 | 97 | 95 | 95 | 90 |
| Rolling resistance | Index value | 100 | 118 | 118 | 133 | 167 | 133 | 115 | 118 | 115 | 140 |
| Wear resistance | Index value | 100 | 110 | 105 | 113 | 115 | 105 | 105 | 102 | 106 | 105 |

FIG. 1

| | | Comparative Example 18 | Working Example 10 | Working Example 11 | Comparative Example 19 | Comparative Example 6 | Comparative Example 7 | Comparative Example 8 | Comparative Example 9 | Comparative Example 20 | Comparative Example 10 | Comparative Example 11 |
|---|---|---|---|---|---|---|---|---|---|---|---|---|
| Modified BR 1 | pbw | 30 | 30 | 30 | 30 | | | | | | 4 | 52 |
| Modified S-SBR | pbw | 72.9 (53) | 72.9 (53) | 72.9 (53) | 72.9 (53) | 90.8 (66) | 90.8 (66) | 90.8 (66) | 90.8 (66) | 90.8 (66) | 108.6 (79) | 42.6 (31) |
| Unmodified SBR | pbw | | | | | 23.4 (17) | | | | | | |
| NR | pbw | 17 | 17 | 17 | 17 | 17 | 17 | 17 | 17 | 17 | 17 | 17 |
| Silica X1 | pbw | 60.0 | 60.0 | 60.0 | 60.0 | 69.0 | 75.0 | 80.0 | 25.0 | 72.0 | 60.0 | 60.0 |
| Silica Y1 | pbw | 10.0 | 10.0 | 10.0 | 10.0 | 11.0 | | | 55.0 | 8.0 | 10.0 | 10.0 |
| Carbon black | pbw | 10.0 | 10.0 | 10.0 | 10.0 | 10.0 | 15.0 | 10.0 | 10.0 | 10.0 | 10.0 | 10.0 |
| Coupling agent | pbw | 5.6 | 5.6 | 5.6 | 5.6 | 6.4 | 6.0 | 6.4 | 6.4 | 6.4 | 5.6 | 5.6 |
| Modified terpene resin 1 | pbw | 1.0 | 5.0 | 45.0 | 60.0 | 10.0 | 10.0 | 10.0 | 10.0 | 10.0 | 7.5 | 7.5 |
| Aroma oil | pbw | 11.5 | 7.5 | 0.0 | 0.0 | 3.7 | 10.0 | 10.0 | 10.0 | 10.0 | 0.0 | 13.3 |
| Silica proportion | wt % | 87.5 | 87.5 | 87.5 | 87.5 | 88.9 | 83.3 | 88.9 | 88.9 | 88.9 | 87.5 | 87.5 |
| Wet performance | Index value | 98 | 103 | 140 | 150 | 103 | 95 | 103 | 98 | 97 | 103 | 100 |
| Rolling resistance | Index value | 138 | 135 | 100 | 90 | 91 | 87 | 100 | 143 | 97 | 90 | 170 |
| Wear resistance | Index value | 113 | 113 | 103 | 95 | 97 | 113 | 110 | 100 | 108 | 95 | 116 |

FIG. 2

|  |  | Comparative Example 12 | Comparative Example 21 | Comparative Example 13 | Comparative Example 14 | Comparative Example 15 | Comparative Example 16 |
|---|---|---|---|---|---|---|---|
| Modified BR 1 | pbw | 30 | 30 | 30 | 30 | 30 | 30 |
| Modified S-SBR | pbw | 72.9 (53) | 72.9 (53) | 72.9 (53) | 72.9 (53) | 72.9 (53) | 72.9 (53) |
| NR | pbw | 17 | 17 | 17 | 17 | 17 | 17 |
| Silica X1 | pbw | 47.0 | 110.0 | 129.0 | 60.0 |  | 60.0 |
| Silica X2 | pbw |  |  |  |  |  |  |
| Silica X3 | pbw |  |  |  |  |  |  |
| Silica Y1 | pbw | 8.0 | 30.0 | 21.0 | 10.0 |  |  |
| Silica Y2 | pbw |  |  |  |  | 35.0 |  |
| Silica Z | pbw |  |  |  |  | 35.0 | 10.0 |
| Carbon black | pbw | 25.0 | 5.0 |  | 10.0 | 10.0 | 10.0 |
| Coupling agent | pbw | 5.6 | 5.6 | 5.6 | 5.6 | 5.6 | 5.6 |
| Modified terpene resin 1 | pbw | 7.5 | 7.5 | 7.5 |  | 7.5 | 7.5 |
| Modified terpene resin 2 | pbw |  |  |  | 7.5 |  |  |
| Aroma oil | pbw | 5.0 | 60.0 | 60.0 | 5.0 | 5.0 | 5.0 |
| Silica proportion | wt.% | 68.8 | 96.3 | 100.0 | 87.5 | 87.5 | 87.5 |
| Wet performance | Index value | 90 | 110 | 115 | 95 | 85 | 98 |
| Rolling resistance | Index value | 85 | 80 | 70 | 150 | 190 | 143 |
| Wear resistance | Index value | 115 | 85 | 85 | 115 | 85 | 95 |

FIG. 3A

| | | Comparative Example 17 | Working Example 6 | Working Example 7 | Working Example 8 | Working Example 9 | Working Example 12 |
|---|---|---|---|---|---|---|---|
| Modified BR 1 | pbw | 30 | 30 | 30 | 30 | 30 | 30 |
| Modified S-SBR | pbw | 72.9 (53) | 72.9 (53) | 72.9 (53) | 72.9 (53) | 72.9 (53) | 72.9 (53) |
| NR | pbw | 17 | 17 | 17 | 17 | 17 | 17 |
| Silica X1 | pbw | 35.0 | 60.0 | | | | 65.0 |
| Silica X2 | pbw | | | 60.0 | | | |
| Silica X3 | pbw | 35.0 | | | 60.0 | 60.0 | |
| Silica Y1 | pbw | | | 10.0 | 10.0 | | 10.0 |
| Silica Y2 | pbw | | 10.0 | | | | |
| Silica Z | pbw | | | | | 10.0 | |
| Carbon black | pbw | 10.0 | 10.0 | 10.0 | 10.0 | 10.0 | |
| Coupling agent | pbw | 5.6 | 5.6 | 5.6 | 5.6 | 5.6 | 5.6 |
| Modified terpene resin 1 | pbw | 7.5 | 7.5 | 7.5 | 7.5 | 7.5 | 7.5 |
| Modified terpene resin 2 | pbw | | | | | | |
| Aroma oil | pbw | 5.0 | 5.0 | 5.0 | 5.0 | 5.0 | |
| Silica proportion | wt.% | 87.5 | 87.5 | 87.5 | 87.5 | 87.5 | 87.5 |
| Wet performance | Index value | 108 | 105 | 107 | 110 | 112 | 105 |
| Rolling resistance | Index value | 98 | 125 | 125 | 110 | 103 | 135 |
| Wear resistance | Index value | 113 | 115 | 115 | 117 | 118 | 113 |

FIG. 3B

| Common components of the rubber compositions | | |
|---|---|---|
| Zinc oxide | 3.0 | pbw |
| Stearic acid | 2.0 | pbw |
| Antiaging agent | 3.0 | pbw |
| Sulfur | 2.2 | pbw |
| Vulcanization accelerator 1 | 2.3 | pbw |
| Vulcanization accelerator 2 | 1.5 | pbw |

FIG. 4

RUBBER COMPOSITION FOR TIRE, AND PNEUMATIC TIRE

TECHNICAL FIELD

The present technology relates to a rubber composition for tires and a pneumatic tire by which low rolling resistance, wet grip performance, and wear resistance are enhanced beyond conventional levels.

BACKGROUND

In recent years, the JATMA (Japan Automobile Tyre Manufacturers Association) labeling system (display) has been introduced for pneumatic tires for passenger cars, and such tires require superior levels of both low rolling resistance and wet grip performance. In particular, the required level of wet grip performance is extremely high, and a pneumatic tire able to achieve grade a in terms of wet grip performance based on this labeling system has yet to be developed. At the same time, improvement in wear resistance has been demanded in order to extend tire life.

It is known that, conventionally, silica is blended in rubber compositions constituting tread portions of pneumatic tires in order to enhance the balance between low rolling resistance and wet grip performance. However, silica readily aggregates due to the presence of surface silanol groups, and because silica exhibits poor affinity for diene rubber, silica dispersibility can be poor and, in such cases, the effect of modifying the dynamic visco-elasticity properties, such as the loss tangent (tan δ), of a rubber composition cannot be satisfactorily achieved. In addition, there is another problem that reinforcing effects of silica is lower than that of carbon black and wear resistance can be insufficient, and when the dispersibility is poor, the wear resistance can be further lowered.

To resolve this problem, Japanese Unexamined Patent Application Publication No. 2009-084413A proposes enhancing low heat build-up properties and wear resistance by a rubber composition compounding silica and polybutadiene rubber in which a terminal is modified with polyorganosiloxane and the like. Although this rubber composition exhibits effects of enhancing the low heat build-up properties and wear resistance, levels of improvement that is demanded by consumers for low rolling resistance and wear resistance as well as wet grip performance are even higher, and further improvement in balance between these performances has been demanded.

SUMMARY

The present technology provides a rubber composition for tires and a pneumatic tire by which low rolling resistance, wet grip performance, and wear resistance can be enhanced to or beyond conventional levels.

The rubber composition for tires of the present technology is a rubber composition for tires comprising: per 100 parts by weight of diene rubber containing from 5 to 50 wt. % of terminal-modified butadiene rubber (modified BR) having a vinyl unit content of 10 to 60 wt. %, from 2 to 50 parts by weight of an aromatic modified terpene resin having a softening point of 100 to 130° C., and a total content of 60 to 130 parts by weight of two types of silica, that is silica X and silica Y; a proportion of the silica relative to a total amount of a reinforcing filler containing the silica X, the silica Y, and an optionally compounded carbon black being 85 wt. % or greater; a nitrogen adsorption specific surface area of the silica X being 140 m$^2$/g or greater; a nitrogen adsorption specific surface area of the silica Y being greater than 100 m$^2$/g and less than 140 m$^2$/g; if a compounded amount of the silica X relative to 100 parts by weight of the diene rubber is x parts by weight and a compounded amount of the silica Y relative to 100 parts by weight of the diene rubber is y parts by weight, a relationship x/7<y≤x being satisfied; and a functional group in the modified BR having reactivity with a silanol group on a surface of the silica.

Furthermore, the pneumatic tire of the present technology is a pneumatic tire using the rubber composition for tires described above.

The rubber composition for tires of the present technology contains from 2 to 50 parts by weight of an aromatic modified terpene resin having a softening point of 100 to 130° C. in diene rubber containing from 5 to 50 wt. % of terminal-modified butadiene rubber (modified BR) having a vinyl unit content of 10 to 60 wt. % and a functional group having reactivity with a silanol group; the compounded amount of the two types of specific silica, that is silica X and silica Y, having a particulate form described above is limited; and a proportion of the silica relative to a total amount of a reinforcing filler is 85 wt. % or greater. Therefore, the rubber composition for tires of the present technology can enhance dispersibility of the silica and enhance low rolling resistance, wet grip performance, and wear resistance to or beyond conventional levels.

The nitrogen adsorption specific surface area of the silica X is preferably 140 m$^2$/g or greater and less than 185 m$^2$/g.

As a functional group of the modified BR, a polyorganosiloxane group, which has excellent reactivity with a silanol group on a surface of the silica and can improve dispersibility of the silica, is preferable.

A pneumatic tire that uses the rubber composition for tires of the present technology can enhance low rolling resistance, wet grip performance, and wear resistance beyond conventional levels.

BRIEF DESCRIPTION OF THE DRAWINGS

FIG. 1 illustrates the compounding proportion and evaluation of each composition of the working examples and the comparative examples of the present technology.

FIG. 2 illustrates the compounding proportion and evaluation of each composition of the working examples and the comparative examples of the present technology.

FIGS. 3A-3B illustrate the compounding proportion and evaluation of each composition of the working examples and the comparative examples of the present technology.

FIG. 4 illustrates the common components used in each composition of the working examples and the comparative examples of the present technology.

DETAILED DESCRIPTION

In the rubber composition for tires of the present technology, the rubber component contains diene rubber. Relative to 100 wt. % of the diene rubber, from 5 to 50 wt. % thereof is terminal-modified butadiene rubber (hereinafter referred to as "modified BR"). The diene rubber can contain from 25 to 95 wt. % of another diene rubber except the modified BR. Examples of the other diene rubber include natural rubber, isoprene rubber, unmodified butadiene rubber, styrene butadiene rubber, terminal-modified styrene butadiene rubber, butyl rubber, bromide of isobutylene/p-methylstyrene copolymer rubber, ethylene-propylene-diene rubber, and the like. Of these, natural rubber, styrene butadiene rubber, terminal-modified styrene butadiene rubber, and bromide of isobutylene/p-methylstyrene copolymer rubber are preferable. The terminal-modified styrene butadiene rubber is, for example, contained at 25 to 66 wt. % in 100 wt. % of the diene rubber.

The content of the modified BR is from 5 to 50 wt. %, and preferably from 10 to 35 wt. %, relative to 100 wt. % of the diene rubber. For example, the content of the modified BR is from 17 to 30 wt. % in 100 wt. % of the diene rubber. If the content of the modified BR is less than 5 wt. %, dispersibility of the silica will be insufficient and low rolling resistance and wear resistance cannot be sufficiently enhanced. Furthermore, if the content of the modified BR exceeds 50 wt. %, wet grip performance will deteriorate.

In the rubber composition of the present technology, the modified BR has the vinyl unit content of 10 to 60 wt. %, and preferably 10 to 30 wt. %. For example, the vinyl unit content is from 10 to 12 wt. %. If the vinyl unit content in the modified BR is less than 10 wt. %, affinity of the modified BR with silica will be insufficient, and low rolling resistance, wet grip performance, and wear resistance cannot be sufficiently enhanced. Furthermore, if the vinyl unit content of the modified BR exceeds 60 wt. %, rolling resistance will deteriorate. The vinyl unit content of the modified BR is measured by infrared spectroscopy (Hampton method). Increase/decrease of the vinyl unit content in the butadiene rubber can be appropriately adjusted by a usual method such as use of a catalyst.

In the present technology, the modified BR is butadiene rubber in which a molecular terminal or both molecular terminals thereof are modified with functional group(s) having reactivity with a silanol group on the surface of the silica. The functional group that reacts with a silanol group is preferably at least one type selected from a polyorganosiloxane group, a hydroxyl group-containing polyorganosiloxane structure, an alkoxysilyl group, a hydroxyl group, an aldehyde group, a carboxyl group, an amino group, an imino group, an epoxy group, an amide group, a thiol group, and an ether group. Of these, a polyorganosiloxane group is more preferable.

The polyorganosiloxane group is preferably a polyorganosiloxane having a structure represented by formula (I) below:

[Formula 1]

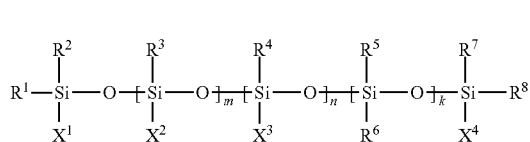

(I)

In the formula, each of $R^1$ to $R^8$ is an alkyl group having from 1 to 6 carbons or an aryl group having from 6 to 12 carbons, and these may be the same or different each other. Each of $X^1$ and $X^4$ is a group having a functional group that reacts with a terminal of the butadiene polymer chain, an alkyl group having from 1 to 6 carbons, or an aryl group having from 6 to 12 carbons, and $X^1$ and $X^4$ may be the same or different each other. $X^2$ is a group having a functional group that reacts with a terminal of the butadiene polymer chain. $X^3$ is a group having from 2 to 20 repeating alkylene glycol units, a portion of the some of $X^3$ may be groups derived from groups having from 2 to 20 repeating alkylene glycol units; and m is an integer from 3 to 200, n is an integer from 0 to 200, and k is an integer from 0 to 200.

The method for preparing the modified BR used in the rubber composition of the present technology is not particularly limited, and usual production method can be applied. A preferable example of the method for producing the modified BR is a method comprising: performing 1,3-butadiene polymerization using an organic lithium compound as a polymerization initiator and a saturated hydrocarbon-based compound as a solvent; and performing a modification reaction using a compound having a functional group that can react with an active terminal of the obtained butadiene polymer, and more preferably using a polyorganosiloxane compound having a functional group that can react with an active terminal of the obtained butadiene polymer.

In the present technology, compounding an aromatic modified terpene resin can enhance the balance between low rolling resistance and wet grip performance and can further enhance wet grip performance in particular. The aromatic modified terpene resin has a softening point of 100° C. or greater, and preferably from 100 to 130° C. For example, the aromatic modified terpene resin may have a softening point of 105 to 125° C. If the softening point of the aromatic modified terpene resin is lower than 100° C., it is not possible to achieve the effect of enhancing wet grip performance. Note that the softening point of the aromatic modified terpene resin is measured in accordance with JIS (Japanese Industrial Standards) K 6220-1.

Examples of the aromatic modified terpene resin compounded in the rubber composition for tires of the present technology include aromatic modified terpene resins obtained by copolymerizing a terpene compound such as α-pinene, β-pinene, dipentene, limonene, and camphene with an aromatic vinyl compound such as styrene, α-methylstyrene, vinyl toluene, phenol, and indene. Of these, styrene is preferable as an aromatic vinyl compound. The aromatic modified terpene resin can be a commercially available product such as YS Resin TO-125, TO-115, TO-105, and TR-105, all of which are manufactured by Yasuhara Chemical Co., Ltd.

The compounded amount of the aromatic modified terpene resin is from 2 to 50 parts by weight, and preferably from 5 to 50 parts by weight, relative to 100 parts by weight of the diene rubber. For example, the compounded amount of the aromatic modified terpene resin is from 7.5 to 10 parts by weight. If the compounded amount of the aromatic modified terpene resin is less than 2 parts by weight, it is not possible to sufficiently enhance the balance between low rolling resistance and wet grip performance. In addition, if the compounded amount of the aromatic modified terpene resin exceeds 50 parts by weight, wear resistance will decrease.

The rubber composition for tires of the present technology contains two types of silica, that is, silica X, which has a nitrogen adsorption specific surface area of 140 $m^2$/g or greater, and silica Y, which has a nitrogen adsorption specific surface area of greater than 100 $m^2$/g and less than 140 $m^2$/g. By compounding the silica X and the silica Y, it is possible to suppress heat build-up in the rubber composition and reduce rolling resistance and improve wet grip performance and wear resistance when using the rubber composition in a tire.

The silica X used in the present technology has a nitrogen adsorption specific surface area of 140 $m^2$/g or greater, preferably from 150 to 230 $m^2$/g, and more preferably 150 $m^2$/g or greater and less than 185 $m^2$/g. For example, the nitrogen adsorption specific surface area is from 160 to 185 $m^2$/g. By compounding the silica X having such a small particle diameter, it is possible to ensure a high level of wet grip performance and wear resistance. If the nitrogen adsorption specific surface area of the silica X is less than 140 $m^2$/g, wet grip performance and wear resistance will be insufficient.

In addition, the nitrogen adsorption specific surface area of the silica Y is greater than 100 m²/g and less than 140 m²/g, preferably greater than 100 m²/g and 130 m²/g or less, and more preferably from 105 to 130 m²/g. For example, the nitrogen adsorption specific surface area is from 110 to 125 m²/g. By compounding the silica Y having a relatively large particle diameter, it is especially possible to reduce heat build-up and rolling resistance when the rubber composition is used in a tire. If the nitrogen adsorption specific surface area of the silica Y is 100 m²/g or less, it is not possible to enhance wet grip performance. In addition, if the nitrogen adsorption specific surface area of the silica Y is 140 m²/g or greater, it is not possible to sufficiently reduce rolling resistance. Moreover, the nitrogen adsorption specific surface area of the silica X and that of the silica Y are determined in accordance with the BET method of ASTM (American Society for Testing and Materials) D 3037-81.

In the present technology, if the compounded amounts of the silica X and the silica Y relative to 100 parts by weight of the diene rubber are x parts by weight and y parts by weight respectively, the total amount of the silica X and the silica Y (x+y) is from 60 to 130 parts by weight, and preferably from 80 to 130 parts by weight. For example, the total amount of the silica X and the silica Y (x+y) is from 80 to 130 parts by weight. If the total amount of the silica X and the silica Y (x+y) is less than 60 parts by weight, it is not possible to sufficiently enhance the balance between low rolling resistance and wet grip performance. If the total amount of the silica X and the silica Y (x+y) exceeds 130 parts by weight, the viscosity of the rubber will increase and processability will deteriorate. Furthermore, wear resistance cannot be ensured sufficiently and rolling resistance will significantly deteriorate.

In addition, the compounded amount of the silica X (x) and the compounded amount of the silica Y (y) are required to satisfy the relationship $x/7<y\leq x$. For example, it is required to satisfy the relationship $x/6\leq y\leq x$. If the compounded amount of the silica Y (y parts by weight) is not greater than one seventh of the compounded amount of the silica X (x parts by weight), that is, not greater than x/7, it is not possible to enhance the balance between low rolling resistance and wet grip performance. In addition, if the compounded amount of the silica Y (y parts by weight) exceeds the compounded amount of the silica X (x parts by weight), wet grip performance will deteriorate.

The rubber composition of the present technology can contain a reinforcing filler other than silica. Examples of other reinforcing fillers include carbon black, clay, talc, calcium carbonate, mica, aluminum hydroxide, and the like. Of these, by compounding carbon black as an essential component, it is possible to reinforce the rubber and ensure dry grip performance and wear resistance. The compounded amount of another reinforcing filler is from 0 to 19.5 parts by weight, and preferably from 3 to 15 parts by weight, relative to 100 parts by weight of the diene rubber. For example, the compounded amount of another reinforcing filler is from 5 to 10 parts by weight.

The proportion of the silica is 85 wt. % or greater, and preferably from 87 to 100 wt. %, relative to the total of 100 wt. % of the reinforcing filler that contains the silica X, the silica Y and carbon black. For example, the proportion of the silica is from 87.5 to 100 wt. % relative to the total of 100 wt. % of the reinforcing filler. If the proportion of the silica is less than 85 wt. %, it is not possible to enhance the balance between low rolling resistance and wet grip performance. Here, the compounded amount of the reinforcing filler other than silica is decided on the basis that the proportion of the silica is 85 wt. % or greater relative to the total of 100 wt. % of the reinforcing filler, and the compounded amount of the silica relative to the 100 parts by weight of the diene rubber is from 60 to 130 parts by weight.

The silica X and the silica Y used in the present technology should be silica having the above-mentioned characteristics, and can be selected as appropriate from among commercially available products. In addition, the silica X and the silica Y may be produced using conventional methods so as to have the above-mentioned characteristics. Types of silica that can be used include, for example, wet method silica, dry method silica, surface treated silica, and the like.

In the rubber composition of the present technology, it is preferable for the silica X and the silica Y to contain a silane coupling agent, and doing so improves the silica dispersibility and enables enhanced reinforcement of the styrene-butadiene rubber. The compounded amount of the silane coupling agent is preferably from 3 to 15 wt. %, and more preferably from 5 to 12 wt. %, of the compounded amount of the silica. For example, it is preferable to compound from 6.4 to 12 wt. % of the silane coupling agent. If the compounded amount of the silane coupling agent is less than 3 wt. % of the compounded amount of the silica, it is not possible to sufficiently achieve the effect of enhancing the silica dispersibility. In addition, if the compounded amount of the silane coupling agent exceeds 15 wt. %, the silane coupling agent will undergo condensation, and the desired effect cannot be achieved.

The silane coupling agent is not particularly limited, but is preferably a sulfur-containing silane coupling agent. Examples thereof include bis-(3-triethoxysilylpropyl)tetrasulfide, bis(3-triethoxysilylpropyl)disulfide, 3-trimethoxysilylpropyl benzothiazole tetrasulfide, γ-mercaptopropyltriethoxysilane, 3-octanoylthiopropyl triethoxysilane, and derivatives thereof, and the like. Derivatives include, for example, NXT-Z (manufactured by Momentive Performance Materials Inc.).

In addition to the above-mentioned fillers, the rubber composition for tires can also contain various types of additives that are commonly used in rubber compositions for tires, such as vulcanization and crosslinking agents, vulcanization accelerators, antiaging agents, plasticizers, and processing aids. These additives may be blended according to any common method to form the rubber composition and may be used in vulcanization or crosslinking. Compounded amounts of these additives may be any conventional amount, as long as the object of the present technology is not impaired. Such a rubber composition can be produced by mixing the above-mentioned components using a known rubber kneading machine such as a Banbury mixer, a kneader, a roll, and the like.

The rubber composition for tires of the present technology can be used in pneumatic tires, and in tire tread portions in particular. A pneumatic tire that uses this rubber composition exhibits excellent wear resistance, low rolling resistance and excellent fuel consumption performance, and also exhibits excellent wet grip performance and exhibits performance corresponding to grade a in terms of wet grip performance based on the JATMA labeling system.

The present technology is further described below by examples. However, the scope of the present technology is not limited to these examples.

EXAMPLES 33 types of rubber compositions for tires were prepared according to the formulations shown in FIGS. 1 to 3B (Working Examples 1 to 12 and Comparative Examples 1 to 21).

The compounding agents, as common components, shown in FIG. 4 (with the exception of the sulfur and the vulcanization accelerator) were compounded with the rubber composition, and the mixture was kneaded in a 1.8 L sealed mixer for 5 minutes. The mixture was then extruded as a master batch, to which the sulfur and the vulcanization accelerator were added. The master batch was then kneaded on an open roll. Note that, in FIGS. 1 to 3B, since modified S-SBR and the unmodified SBR each contain 37.5 parts by weight of an oil-extension oil, the compounded amount rows show the actual compounded amount and (in parentheses) the net compounding amount of SBR excluding the oil-extension oil. In addition, the compounded amount of the aroma oil was adjusted as appropriate so that the total oil amount in the rubber composition and/or rubber hardness were at comparable levels. The proportion of the silica relative to the total amount of silica and carbon black is shown in the "Silica proportion" rows. Moreover, the amounts of the compounding agents shown in FIG. 4 are shown as parts by weight relative to 100 parts by weight of the diene rubbers shown in FIGS. 1 to 3B (net rubber quantity).

The 33 types of the obtained rubber compositions for tires were measured in terms of tan δ (60° C.) and wear resistance according to the following method.

tan δ (60° C.)

The obtained 33 types of rubber compositions for tires were press-vulcanized for 25 minutes at 160° C. in a die with a prescribed shape so as to produce vulcanized rubber samples. The tan δ (60° C.) value of the obtained vulcanized rubber samples was measured using a viscoelasticity spectrometer (manufactured by Toyo Seiki Seisaku-sho, Ltd.) under the following conditions: 10% initial distortion, ±2% amplitude, 20 Hz frequency, and 60° C. temperature. The obtained results are shown on the "rolling resistance" rows of FIGS. 1 to 3B, with an inverse of the value of Comparative Example 1 being 100. Higher index values indicate smaller tan δ (60° C.) values and lower heat build-up, which in turn indicates a lower rolling resistance and superior fuel consumption performance when used in a pneumatic tire.

Wear Resistance

Lambourn abrasion of the obtained vulcanized rubber samples was measured in accordance with JIS K6264-2 using a Lambourn abrasion resistance test machine (manufactured by Iwamoto Seisakusho K.K.) under the following conditions: 20° C. temperature, 15 N load, and 50% slip ratio. The obtained results are shown in FIGS. 1 to 3B, with an inverse of the value of Comparative Example 1 being 100. Larger index values indicate superior wear resistance.

Next, sets of four pneumatic tires having tire sizes of 205/55 R16 were produced. In each of the sets of four tires, one of the 33 types of rubber compositions for tires described above was used in the tread portion. The wet grip performance of each of the obtained 33 types of pneumatic tires was evaluated according to the method described below.

Wet Grip Performance

The obtained pneumatic tires were fitted to wheels having rim sizes of 6.5×J, the wheels were fitted to a 2.0 liter class test vehicle, and the wet grip performance was measured in accordance with the EU TEST METHOD FOR TYRE WET GRIP GRADING (C1 TYPES). The obtained results are shown on the "Wet performance" rows of FIGS. 1 to 3B, with an index value of Comparative Example 1 being 100. Greater wet performance index values indicate superior wet grip performance.

The types of raw materials used in FIGS. 1 to 3B are indicated below.

Modified BR 1: butadiene rubber in which a molecular terminal thereof was modified with a polyorganosiloxane group. The modified BR 1 was prepared by the production method described below in the manner that the vinyl unit content was 12 wt. %.

[Method of Producing the Modified BR 1]

In a nitrogen-purged autoclave reaction vessel having an internal capacity of 10 L, 4000 g of cyclohexane, 600 g of 1,3-butadiene, and 0.28 mmol of tetramethyl ethylenediamine were placed. Thereafter, n-butyllithium was added in an amount required to neutralize impurities that inhibits polymerization and that are included in the cyclohexane and 1,3-butadiene. Furthermore, 7.7 mmol of n-butyllithium, for use in the polymerization reaction, was added and the polymerization was initiated at 50° C. After 20 minutes from the initiation of the polymerization, 400 g of 1,3-butadiene was added continuously over 30 minutes. The highest temperature during the polymerization reaction was 80° C. After the continuous addition, the polymerization reaction was further continued for 15 minutes, and when it was confirmed that the polymerization conversion ratio was in a range of 95% to 100%, the reaction was stopped by adding excess amount of methanol. 0.027 mmol of polyorganosiloxane A having a diglycidyl ether group on a terminal in a xylene solution (concentration: 20%) was added and reacted for 30 minutes. Then, as a polymerization terminator, methanol in an amount corresponding to twice the molar quantity of the used n-butyllithium was added to obtain a polymer solution containing polybutadiene rubber. Thereafter, the polymer solution was dried in a drier to obtain the modified BR 1. The vinyl unit content of the modified BR 1 was 12 wt. % according to the measurement performed by infrared spectroscopy (Hampton method).

Polyorganosiloxane A: polyorganosiloxane having the structure of general formula (I) below, wherein m=80, n=0, k=120, $X^1$, $X^4$, $R^1$ to $R^3$, and $R^5$ to $R^8$ are each methyl groups (—$CH_3$), and $X^2$ is a hydrocarbon group represented by formula (II) below.

[Formula 2]

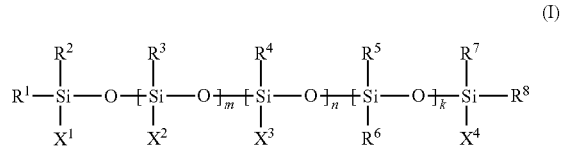

[Formula 3]

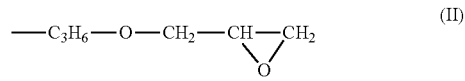

Modified BR 2: butadiene rubber in which a molecular terminal thereof was modified with a polyorganosiloxane group. The modified BR 2 was prepared by the production method described below in the manner that the vinyl unit content was 8 wt. %.

[Method of Producing the Modified BR 2]

A polymer solution containing polybutadiene rubber was obtained in the same manner as for the modified BR 1 except for changing the amount of the tetramethyl ethylenediamine to 0.07 mmol. Thereafter, the polymer solution was dried in a drier to obtain the modified BR 2. The vinyl unit content of the modified BR 2 was 8 wt. % according to the measurement performed by infrared spectroscopy (Hampton method).

BR1: unmodified butadiene rubber having the vinyl unit content of 1 wt. %; Nipol BR1220, manufactured by Zeon Corporation BR2: unmodified butadiene rubber having the vinyl unit content of 12 wt. %; UBEPOL VCR412, manufactured by Ube Industries, Ltd.

Modified S-SBR: solution polymerization-produced styrene-butadiene rubber having a hydroxyl group on a molecular terminal; Tufden E581, manufactured by Asahi Kasei Chemicals Corporation; vinyl unit content: 43 wt. %; oil-extended rubber containing 37.5 parts by weight of oil relative to 100 parts by weight of rubber component Unmodified SBR: Tufden 1834, manufactured by Asahi Kasei Chemicals Corporation; vinyl unit content: 10 wt. %; oil-extended rubber containing 37.5 parts by weight of oil relative to 100 parts by weight of rubber component NR: Natural rubber, SIR-20

Silica X1: Zeosil 1165MP, manufactured by Rhodia; nitrogen adsorption specific surface area: 160 $m^2/g$.

Silica X2: Zeosil 195GR, manufactured by Rhodia; nitrogen adsorption specific surface area: 180 $m^2/g$ Silica X3: Zeosil 200MP, manufactured by Rhodia; nitrogen adsorption specific surface area: 220 $m^2/g$.

Silica Y1: Zeosil 115GR, manufactured by Rhodia; nitrogen adsorption specific surface area: 110 $m^2/g$ Silica Y2: Ultrasil 5000GR, manufactured by Degussa; nitrogen adsorption specific surface area: 125 $m^2/g$ Silica Z: Ultrasil 360, manufactured by Degussa; nitrogen adsorption specific surface area: 50 $m^2/g$ Carbon black: Sho Black N234, manufactured by Cabot Japan K.K.

Silane coupling agent: sulfur-containing silane coupling agent; Si69, manufactured by Evonik Degussa Modified terpene resin 1: aromatic modified terpene resin; YS Resin TO-125, manufactured by Yasuhara Chemical Co., Ltd.; softening point: 125° C.

Modified terpene resin 2: aromatic modified terpene resin; YS Resin TO-85, manufactured by Yasuhara Chemical Co., Ltd.; softening point: 85° C.

Aroma oil: Extract 4S, manufactured by Showa Shell Seikyu K.K.

The types of raw materials used in FIG. 4 are indicated below.

Zinc oxide: Zinc Oxide #3, manufactured by Seido Chemical Industry Co., Ltd.

Stearic acid: industrial stearic acid N, manufactured by Chiba Fatty Acid

Antiaging agent: Ozonon 6C, manufactured by Seiko Chemical Co., Ltd.

Sulfur: "Golden Flower" oil-treated sulfur powder, manufactured by Tsurumi Chemical Industry Co., Ltd.

Vulcanization accelerator 1: Noccelar CZ-G, manufactured by Ouchi Shinko Chemical Industrial Co., Ltd.

Vulcanization accelerator 2: PERKACIT DPG, manufactured by Flexsys

As is clear from FIGS. 1 to 3B, it was confirmed that the rubber compositions for tires of Working Examples 1 to 12 maintained/enhanced low rolling resistance (tan δ at 60° C.), wear resistance, and wet grip performance to or beyond conventional levels.

Since, in the rubber composition of Comparative Example 2, the vinyl unit content of the modified BR 2 was less than 10 wt. %, wet grip performance and low rolling resistance deteriorated compared to that of the rubber composition of Working Example 3. Since, in the rubber composition of Comparative Example 3, the vinyl unit content of the BR 1 was less than 10 wt. % and the BR 1 was not modified at the terminal, wet grip performance and wear resistance deteriorated compared to that of the rubber composition of Working Example 3. Since, in the rubber composition of Comparative Example 4, although the vinyl unit content of the BR 2 was 10 wt. % or greater, the BR 2 was not modified at the terminal, wet grip performance and low rolling resistance deteriorated compared to that of the rubber composition of Working Example 3. Since the rubber composition of the Comparative Example 5 did not contain a modified terpene resin, wet performance and wear resistance deteriorated compared to that of the rubber composition of Working Example 3. Since, in the rubber composition of Comparative Example 18, the compounded amount of the modified terpene resin was less than 2 parts by weight, wet performance deteriorated. Since, in the rubber composition of Comparative Example 19, the compounded amount of the modified terpene resin exceeded 50 parts by weight, wear resistance deteriorated.

Although the rubber composition of Comparative Example 6 contained the unmodified SBR which was excellent in wear resistance in place of modified BR 1, wear resistance was insufficient and rolling resistance deteriorated. Since the rubber composition of Comparative Example 7 did not contain the silica Y and the proportion of the silica relative to the total amount of the filler was less than 85 wt. %, wet performance and rolling resistance deteriorated. The rubber composition of Comparative Example 8 did not contain the silica Y, and could not therefore enhance rolling resistance. Since, in the rubber composition of Comparative Example 9, the compounded amount of the silica Y was greater than the compounded amount of the silica X, wet grip performance deteriorated although rolling resistance was enhanced. Since, in the rubber composition of Comparative Example 20, the compounded amount of the silica Y was less than or equal to one seventh of the compounded amount of the silica X, wet grip performance and low rolling resistance deteriorated. Since, in the rubber composition of Comparative Example 21, the total amount of the silica X and the silica Y (x+y) exceeded 130 parts by weight, wear resistance was not sufficiently ensured and low rolling resistance deteriorated.

Since, in the rubber composition of Comparative Example 10, the compounded amount of the modified BR 1 was less than 5 wt. %, low rolling resistance and wear resistance deteriorated. Since, in the rubber composition of Comparative Example 11, the compounded amount of the modified BR 1 exceeded 50 wt. %, it was not possible to enhance wet grip performance. Since, in the rubber composition of Comparative Example 12, the total amount of the silica X and the silica Y (x+y) was less than 60 parts by weight and the proportion of the silica relative to the total amount of the filler was less than 85 wt. %, it was not possible to sufficiently enhance the balance between low rolling resistance and wet grip performance. Since, in the rubber composition of Comparative Example 13, the total amount of the silica X and the silica Y (x+y) exceeded 130 parts by weight, wear resistance was not sufficiently ensured and rolling resistance deteriorated significantly. Since, in the rubber composition of Comparative Example 14, the aromatic modified terpene resin 2 had a softening point of lower than 100° C., wet grip performance deteriorated.

The rubber composition of Comparative Example 15 did not contain the silica X, but contained two types of silica having nitrogen adsorption specific surface areas of less than 140 $m^2/g$ (the silica Y2 and the silica Z), and therefore exhibited inferior wet grip performance and wear resistance.

The rubber composition of Comparative Example 16 contained the silica Z having a nitrogen adsorption specific surface area of 100 m²/g or less in place of the silica Y, and therefore exhibited inferior wet grip performance and wear resistance.

The rubber composition of Comparative Example 17 did not contain the silica Y, but contained two types of silica having nitrogen adsorption specific surface areas of 140 m²/g or greater (the silica X1 and the silica X3), and therefore exhibited inferior rolling resistance.

What is claimed is:

1. A rubber composition for tires comprising: per 100 parts by weight of diene rubber containing from 5 to 50 wt. % of terminal-modified butadiene rubber (modified BR) having a vinyl unit content of 10 to 60 wt. %,
   from 2 to 50 parts by weight of an aromatic modified terpene resin having a softening point of 100 to 130° C., and
   a total content of 60 to 130 parts by weight of two types of silica, that is silica X and silica Y;
   a proportion of the silica relative to a total amount of a reinforcing filler containing the silica X, the silica Y, and an optionally compounded carbon black being 85 wt. % or greater;
   a nitrogen adsorption specific surface area of the silica X being 140 m²/g or greater and less than 185 m2/g;
   a nitrogen adsorption specific surface area of the silica Y being greater than 100 m²/g and less than 140 m²/g;
   a relationship $x/7 < y$ $x/6$ being satisfied where a compounded amount of the silica X relative to 100 parts by weight of the diene rubber is x parts by weight and a compounded amount of the silica Y relative to 100 parts by weight of the diene rubber is y parts by weight; and
   a functional group of the modified butadiene rubber being at least one type selected from a group consisting of a polyorganosiloxane group, a hydroxyl group-containing polyorganosiloxane structure, an alkoxysilyl group, a hydroxyl group, an aldehyde group, a carboxyl group, an amino group, an imino group, an epoxy group, an amide group, a thiol group, and an ether group.

2. The rubber composition for tires according to claim 1, wherein the functional group of the terminal-modified butadiene rubber is a polyorganosiloxane group.

3. The rubber composition for tires according to claim 1, wherein the diene rubber further contains from 25 to 95 wt. % of terminal-modified styrene butadiene rubber.

4. A pneumatic tire using the rubber composition for tires described in claim 1.

5. The rubber composition of claim 1, wherein the diene rubber further comprises from 25 to 95 wt % of a second diene rubber including natural rubber except the terminal-modified butadiene rubber.

* * * * *